(12) United States Patent
Ali et al.

(10) Patent No.: US 7,082,222 B2
(45) Date of Patent: Jul. 25, 2006

(54) SYSTEM AND METHOD FOR OPTIMIZING CONTROL PARAMETER SETTINGS IN A CHAIN OF VIDEO PROCESSING ALGORITHMS

(75) Inventors: Walid S. Ibrahim Ali, Ossinning, NY (US); Cornelis Van Zon, Peekskill, NY (US)

(73) Assignee: Koninklije Philips Electronics N.V., Eindhoven (NL)

( * ) Notice: Subject to any disclaimer, the term of this patent is extended or adjusted under 35 U.S.C. 154(b) by 812 days.

(21) Appl. No.: 09/817,981

(22) Filed: Mar. 27, 2001

(65) Prior Publication Data

US 2002/0143718 A1   Oct. 3, 2002

Related U.S. Application Data

(60) Provisional application No. 60/260,841, filed on Jan. 10, 2001.

(51) Int. Cl.
*G06K 9/46* (2006.01)

(52) U.S. Cl. .................. 382/254; 382/303; 706/13

(58) Field of Classification Search ................ 382/254, 382/303; 706/13
See application file for complete search history.

(56) References Cited

U.S. PATENT DOCUMENTS 6,004,015 A * 12/1999 Watanabe et al. ............. 700/28

FOREIGN PATENT DOCUMENTS

| EP | 0714069 | 5/1996 |
|----|---------|--------|
| WO | WO033207 | 6/2000 |
| WO | WO0056056 | 9/2000 |

OTHER PUBLICATIONS

Karl Sims, "Artificial Evolution for Computer Graphics", Computer Graphics, 25(4), Jul. 1991, pp. 319-328.*
Steven Levy, "Artificial Life" 1992.*
Karl Sims, "Artificial Evolution for Computer Graphics", Computer Graphics, Jul. 1991.*
L.J. Esheiman, "The CHC Adaptive Search Algorithm: How to Have Safe Search When Engaging in Nontraditional Genetic Recombination" pp. 265-283, 1991.
P.Husbands, "Genetic Algorithms in Optimisation and Adaptation", pp. 227-276, 1990.
A.Chipperfield et al, "Parallel Genetic Algorithms", pp. 1118-1143, 1996.

* cited by examiner

*Primary Examiner*—Andrew W. Johns
*Assistant Examiner*—Patrick Edwards

(57) ABSTRACT

For use in a video processing system that is capable of processing a video stream using a chain of video processing algorithms, there is disclosed a system and method for optimally configuring control parameter settings of each video processing algorithm within the chain of video processing algorithms in order to provide a high quality video image. The video processing system of the present invention comprises a chain of video processing algorithms, an optimization unit, and an objective quality metric unit. An output video stream from the chain of video processing units is fed back to the objective quality metric unit. The objective quality metric unit calculates a fitness value and provides the fitness value to the optimization unit. The optimization unit uses the fitness value to configure the control parameter settings for the video processing algorithms. In one advantageous embodiment of the present invention, the optimization unit uses a genetic algorithm in the optimization process. The video processing system iteratively converges toward control parameter configurations that produce a very high quality video image.

24 Claims, 3 Drawing Sheets

SYSTEM AND METHOD FOR OPTIMIZING CONTROL PARAMETER SETTINGS IN A CHAIN OF VIDEO PROCESSING ALGORITHMS

CROSS REFERENCE TO RELATED APPLICATIONS

The present application claims the benefit of U.S. Provisional Application Ser. No. 60/260,841, filed on Jan. 10, 2001.

RELATED INVENTION

This patent invention is related to that disclosed in U.S. patent application Ser. No. 09/734,823 filed Dec. 12, 2000 by Ali et al. entitled "System and Method for Providing a Scalable Dynamic Objective Metric for Automatic Video Quality Evaluation." The related patent application is commonly assigned to the assignee of the present invention. The disclosure of the related patent application is hereby incorporated by reference in the present patent application as if fully set forth herein.

TECHNICAL FIELD OF THE INVENTION

The present invention is directed, in general, to video processing systems that are capable of processing video streams using a chain of video processing algorithms and, more specifically, to a system and method for optimally configuring control parameter settings of each video processing algorithm in order to provide a high quality video image.

BACKGROUND OF THE INVENTION

Video experts continually seek to develop new and improved video processing algorithms for improving the quality of video images. The primary goal is to obtain the highest quality video image possible. In a video processing system, one or more video processing algorithms are applied to a video stream to modify the characteristics of the video stream to obtain the highest level of video quality.

For example, in a television set, a video signal stream may be processed by a number of video functions. These video functions may include sharpness enhancement, noise reduction, color correction, and other similar video image processing techniques. Each video function may have one or more control parameters that must be set to particular values. The values of the control parameter settings affect the quality of the video image. Furthermore, the order in which the various video functions are applied may also affect the quality of the video image.

As video systems are developed, new types of video processing algorithms are constantly being introduced. In addition, older types of video processing algorithms are constantly being refined. The capabilities of video processing algorithms tend to increase over time. Similarly, the implementation complexity of video processing algorithms also tends to increase over time.

Video processing algorithms are usually developed and evaluated in isolation from the video processing systems in which they will ultimately be used. After evaluation, the individual video processing algorithms are combined in a video processing system such as a television, set-top box, or other type of consumer product.

The final video image quality obtainable by a chain of video processing algorithms in a video processing system strongly depends on the interaction of all of the various constituent video processing algorithms. This interaction depends on the control parameter settings for each algorithm, the amount of data being transferred between sequential algorithms as well as the order of the sequential algorithms in the video processing chain. Ad hoc methods have long been available to determine the best control parameter settings for a sequence of video processing algorithms. However, the currently available ad hoc methods for optimizing the overall video image quality are very time consuming and do not guarantee the best possible result.

There is therefore a need in the art for a system and method that will provide a thorough analysis of the interaction of video processing algorithms in a chain of video processing algorithms. There is also a need in the art for a system and method that will provide a formal simulation environment for testing the interaction of video processing algorithms to find the optimum combination of control parameter settings to provide a high quality video image.

There is also a need in the art for a system and method that will enable the optimum order of video processing algorithms to be determined. There is also a need in the art for a system and method that will enable the best settings for the control parameters of the video processing algorithms to be determined. There is also a need in the art for a system and method that will enable the best settings for the bit precision parameter of the video processing algorithms to be determined.

SUMMARY OF THE INVENTION

To address the above-discussed deficiencies of the prior art, the system and method of the present invention provides an automated procedure for optimizing control parameter settings in video processing algorithms in order to obtain a very high level of video image quality.

The video processing system of the present invention comprises a chain of video processing algorithms, an optimization unit, and an objective quality metric unit. An output video stream from the chain of video processing units is fed back to the objective quality metric unit. The objective quality metric unit calculates a fitness value and provides the fitness value to the optimization unit. The optimization unit uses the fitness value to configure the control parameter settings for the video processing algorithms. The video processing system iteratively converges toward control parameter configurations that produce a very high quality video image. In one advantageous embodiment the optimization unit comprises a genetic algorithm unit that uses a genetic algorithm to perform the optimization process.

It is an object of the present invention to provide a system and method for optimally configuring video processing algorithms in order to provide a high quality video image.

It is another object of the present invention to provide a system and method for optimally configuring the order of application of video processing algorithms in order to provide a high quality video image.

It is also an object of the present invention to provide a system and method that uses an optimization unit to optimize at least one control parameter setting of at least one video processing algorithm.

It is an additional object of the present invention to provide a system and method that uses a genetic algorithm to optimize at least one control parameter setting of at least one video processing algorithm.

It is another object of the present invention to provide a system and method for optimizing control parameter settings in video processing algorithms using a fitness value that represents the video quality of a video stream.

It is also an object of the present invention to provide a combination of an objective quality metric unit and an optimization unit for optimizing control parameter settings in video processing algorithms.

It is another object of the present invention to provide a system and method for optimizing control parameter settings in video processing algorithms in video processing systems that comprise a plurality of chains of video processing algorithms.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. In the description of the exemplary embodiment that follows, the present invention is integrated into, or is used in connection with, a video processing system. Those skilled in the art will recognize that the exemplary embodiment of the present invention may easily be modified for use in any type of video processing system.

Figure 1:
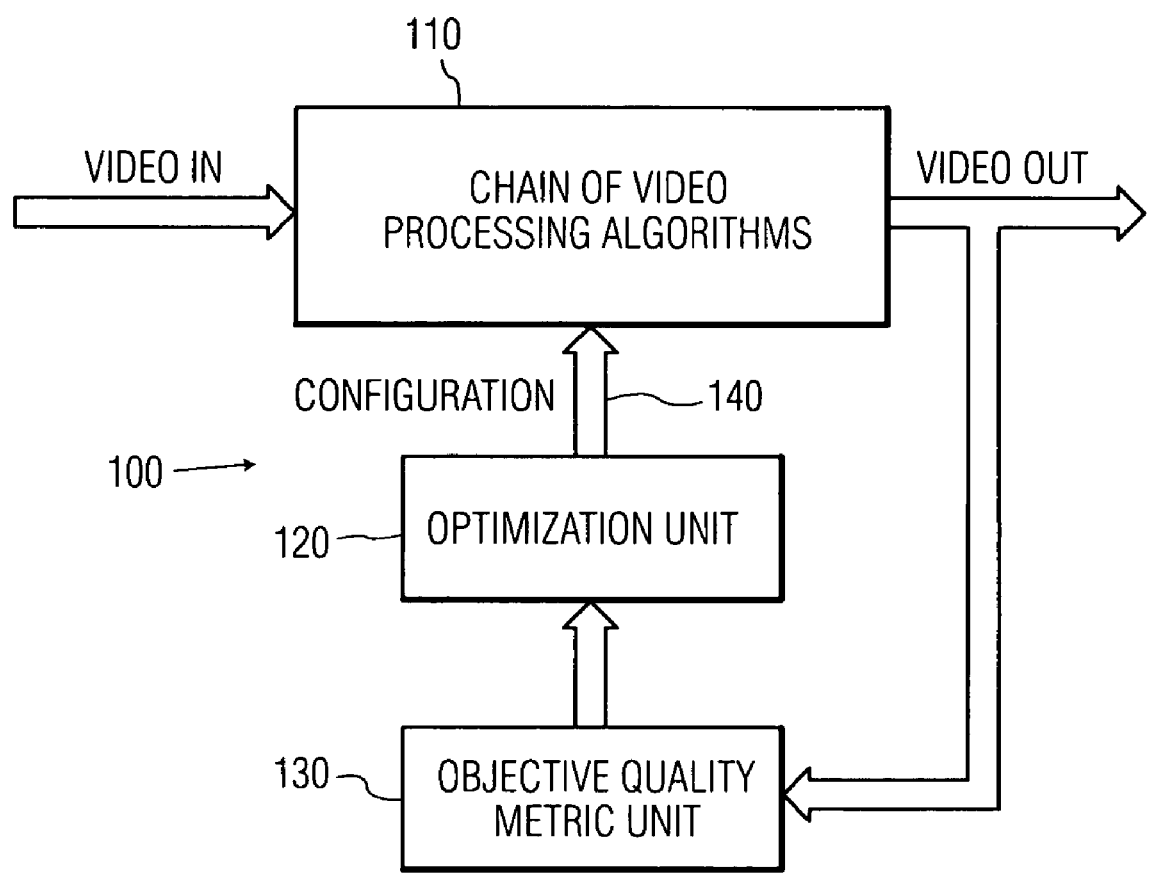
FIG. 1 illustrates a block diagram of an exemplary video processing system for configuring a chain of video processing algorithms using the system and method of the present invention.

FIG. 1 illustrates a block diagram of an exemplary video processing system 100 of the present invention for optimizing the control parameter settings in each video processing algorithm within a chain of video processing algorithms. Video processing system 100 generally comprises a chain 110 of video processing algorithms, optimization unit 120, and objective quality metric unit 130. An input video stream (labeled "Video In" in FIG. 1) is provided as input to chain 110. An output video stream (labeled "Video Out" in FIG. 1) is output from chain 110. A copy of the output video stream is fed back to objective quality metric unit 130.

Objective quality metric unit 130 provides a scalable dynamic objective metric for automatically evaluating video quality. Information concerning the details of the operation of objective quality metric unit 130 is set forth and described in U.S. patent application Ser. No. 09/734,823 filed Dec. 12, 2000 by Ali et al. entitled "System and Method for Providing a Scalable Dynamic Objective Metric for Automatic Video Quality Evaluation."

The output of object quality metric unit 130 is provided as input to optimization unit 120. As will be more fully described, optimization unit 120 configures the control parameter settings for each of the video processing algorithms in chain 110. Optimization unit 120 may use different types of optimization techniques. For purposes of illustration of the present invention, an advantageous embodiment of optimization unit 120 will be described that uses "genetic algorithm" optimization techniques. The present invention, however, is not limited to the use of genetic algorithm optimization techniques. It is clear that other types of optimization techniques may also be employed in the present invention.

Genetic algorithm optimization techniques are based on the evolutionary concept that diversity helps to ensure a population's survival under changing environmental conditions. See, generally, "Genetic Algorithms in Search, Optimization, and Machine Learning" by David E. Goldberg, Addison-Wesley, Reading, Mass., 1989. Genetic algorithms are simple and robust methods for optimization and search. Genetic algorithms are iterative procedures that maintain a population of candidate solutions encoded in the form of chromosomes. The initial population of candidate solutions can be selected heuristically or randomly. A chromosome defines each candidate solution in a generation. For each generation, each candidate solution is evaluated and assigned a fitness value. The fitness value is generally a function of the decoded bits contained in each candidate solution's chromosome. These candidate solutions will be selected for reproduction in the next generation based on their fitness values. The fitness value in the present invention is provided by objective quality metric unit 130.

The selected candidate solutions are combined using a genetic recombination operation known as "cross over." The cross over operator exchanges portions of bits of chromosomes to hopefully produce better candidate solutions with higher fitness for the next generation. A "mutation" is then applied to perturb the bits of chromosomes in order to guarantee that the probability of searching a particular subspace of the problem space is never zero. For more information, refer to the article entitled "Parallel Genetic Algorithms" by A. Chipperfield and P. Fleming on pages 1118–1143 of the book *Parallel and Distributed Computing Handbook* by A. Y. H. zomaya, McGraw Hill, N.Y., 1996. The "mutation" also prevents the genetic algorithm from becoming trapped on local optima. See, generally, the article entitled "Genetic Algorithms in Optimization and Adaptation" by P. Husbands on pages 227–276 of the book *Advances in Parallel Algorithms* by L. Kronsjo and D. Shumsheruddin (editors), Blackwell Scientific, Boston, Mass., 1990.

The whole population of candidate solutions is evaluated again in the next generation and the process continues until the process reaches the termination criterion. The termination criterion may be triggered by finding an acceptable approximate solution, by reaching a specific number of generations, or by reaching a convergence of the solution to the theoretical optimum.

The system and method of the present invention utilizes genetic algorithms to come up with choices for optimal control parameter settings for the video processing algorithms. Genetic algorithms also provide implementation alternatives and provide an interconnection scheme for obtaining the best objective video quality. In optimizing the video processing scheme, a chromosome defines a certain way in which different video processing algorithms are connected and, therefore, the way in which video sequences are processed. A chromosome consists of a number of genes. The genes in the video optimization process of the present invention comprise (1) video processing functions, and (2) the order of application of the video processing functions (which determines the connection scheme).

Figure 2:
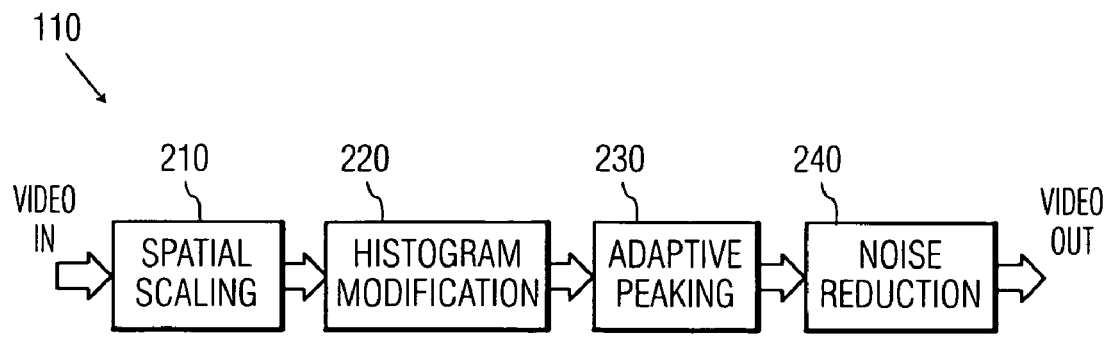
FIG. 2 illustrates a block diagram of a chain of four video processing algorithms comprising a spatial scaling algorithm, a histogram modification algorithm, an adaptive peaking algorithm, and a noise reduction algorithm.

FIG. 2 illustrates a block diagram of an exemplary embodiment of chain 110. In this embodiment, chain 110 comprises four (4) video processing algorithms. The four video processing algorithms are spatial scaling algorithm 210, histogram modification algorithm 220, adaptive peaking algorithm 230, and noise reduction algorithm 240. The present invention is not limited to an embodiment having four (4) video processing algorithms. Chain 110 of video processing algorithms may generally comprise any integer number of video processing algorithms.

Figure 3:
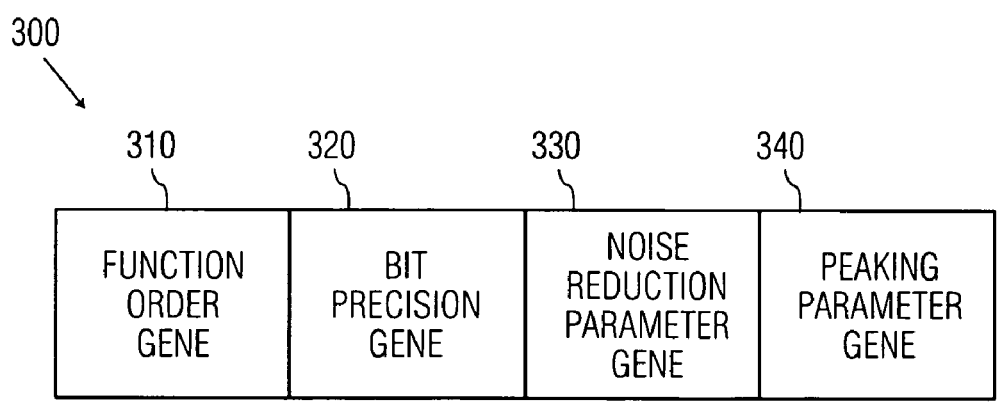
FIG. 3 illustrates a block diagram of a video processing chromosome of the present invention comprising a function order gene, a bit precision gene, a noise reduction parameter gene, and a peaking parameter gene.

FIG. 3 illustrates a block diagram of a video processing chromosome 300 of the present invention. Chromosome 300 comprises function order gene 310, bit precision gene 320, noise reduction parameter gene 330, and peaking parameter gene 340. Each of the video processing algorithms (210, 220, 230, 240) in chain 110 can be configured using the four (4) genes (310, 320, 330, 340) in chromosome 300. Specifically, the order of application of the video processing algorithms can be changed, the control parameter settings of each video processing algorithm can be changed, and the bit precision of each video processing algorithm can be changed.

In one advantageous embodiment of the present invention, optimization unit 120 uses a genetic algorithm optimization technique to configure the control parameters of each of the video processing algorithms (210, 220, 230, 240). The genetic algorithm uses information located in the genes (310, 320, 330, 340) of chromosome 300. For example, peaking parameter gene 340 can be used to change the peaking (sharpness) control parameter for each of the four (4) video processing algorithms. The process of configuring the video processing algorithms is indicated schematically in FIG. 1 by arrow 140.

Optimization unit 120 configures each video processing algorithm as generically as possible. That is, optimization unit 120 assumes no prior information about a particular video processing algorithm or about its connectivity constraints (i.e., the order of the video processing algorithms). Optimization unit 120 perturbs the pre-defined set of control parameters of each video processing algorithm in chain 110. The data bit precision (i.e., the number of bits in a data bus, or "bus width") between two sequential video processing algorithms is also a control parameter to be optimized.

Using the fitness value from objective quality metric unit 130, a genetic algorithm used by optimization unit 120 continually determines which configuration of control parameters (i.e., a candidate solution) should be tried next. The candidate solutions that provide good video images are retained while candidate solutions that provide poor video images are discarded. Driven by this "survival of the fittest" principle, video processing system 100 iteratively converges toward control parameter configurations that produce the best high quality video image.

The genetic algorithm used by optimization unit 120 may be a variation of a standard genetic search algorithm. For additional information, refer to an article entitled "The CHC Adaptive Search Algorithm. How to Have Safe Search When Engaging in Nontraditional Genetic Recombination" by L. Eshelman on pages 265–283 of the book *Foundations of Genetic Algorithms* by G. Rawlins (editor), Morgan Kaufman Publishers, N.Y., 1991. The initial population of N chromosomes is generated randomly and each of the chromosomes is evaluated. An intermediate population is generated in the following fashion: (1) The current population is copied to the intermediate population. (2) Each chromosome in the current population is randomly paired with another chromosome. (3) Cross over is performed if the difference criterion is satisfied. (4) The user can specify the cross over criterion. (5) The resulting "children" are evaluated and added to the immediate population.

The resulting intermediate population has more than N chromosomes (2N if all the chromosomes pairs are different enough). The best N chromosomes from the intermediate population are selected and passed to the next generation. Note that no mutation is performed during this stage. Two chromosomes are crossed over only if the difference between them is above a threshold. This threshold is lowered when no chromosome pairs can be found with a difference above the threshold. When the threshold reaches zero ("0"), a re-initialization (or "divergence") of the population is done. Here the best chromosome available is selected as a representative and copied over to the next generation. The rest of the chromosomes are generated by mutating a percentage of the bits (e.g., thirty five percent (35%)) of this template chromosome.

The genetic algorithm terminates when the number of divergences or "failed" divergences (i.e., divergences which did not improve the result) reaches a specified number. The user can also specify the maximum trials (i.e., evaluations) allowed.

The particular set of video processing algorithms shown in FIG. 2 was chosen as an illustrative example because of their vital role in any video processing system. Moreover, some of the video processing algorithms shown in FIG. 2 have competing requirements. For example, (1) increasing the sharpness would enhance the perceived existing noise, and (2) reducing the noise will blur the picture resulting in the loss of image crispness.

As previously mentioned, video processing system 100 generally comprises chain 110 of video processing algorithms, optimization unit 120, and objective quality metric unit 130. The computational bottleneck in video processing system 100 results from the complexity of the video processing algorithms of chain 110. In order to reduce the computational requirements, it is possible to simultaneously run in parallel a number of chains of video processing algorithms (depending on the available computation processors on a parallel computer). It is also possible to simultaneously run a number of objective quality metric units. The approach of using parallel units for the computationally greedy portions of video processing system 100 significantly enhances the overall performance that may be obtained.

Genetic algorithms of the type utilized by optimization unit 120 can easily accommodate the insertion of new video processing algorithms and the removal of old video processing algorithms from chain 110. In this manner, video processing system 100 can periodically re-optimize the video processing algorithms in chain 110 with available implementations of video processing algorithms (210, 220, 230, 240).

It is noted that the possible combinations of control parameters present an enormous number of choices. For example, the relatively small chain of four (4) video processing algorithms could generate as many as one hundred thousand (100,000) configurations. In order to effectively optimize the control parameter settings of the video processing algorithms, it is preferable to first reduce the enormous search space to a manageable size.

It is not necessary to consider each individual characteristic of each candidate solution in a whole breed of a generation. If the chromosome in question has a long sequence, then a thorough study of each individual candidate solution will be expensive. There will likely be a set of many very similar candidate solutions. The goal is to find and select "fit" individuals (i.e., candidate solutions that cause chain 110 to produce a high quality video signal). It is more efficient to select a limited number of representative individuals and study the representative individuals rather than study every individual in the whole generation.

It is also possible to delete an "unfit" branch of the "evolution" process according to the branch's inherited chromosome structure. In accordance with the probabilities of the "evolution" process, it is likely that a good "father" (an implementation that has a desired behavioral trait such as good subjective sharpness enhancement) will have a "son" that will inherit the same desired behavioral trait. That is, "fit" branches will be allowed to propagate and "unfit" branches will not be allowed to propagate.

Modifying the genetic algorithm using these guidelines will result in a reduction in the time required for the optimization process to converge to an optimal candidate solution.

Figure 4:
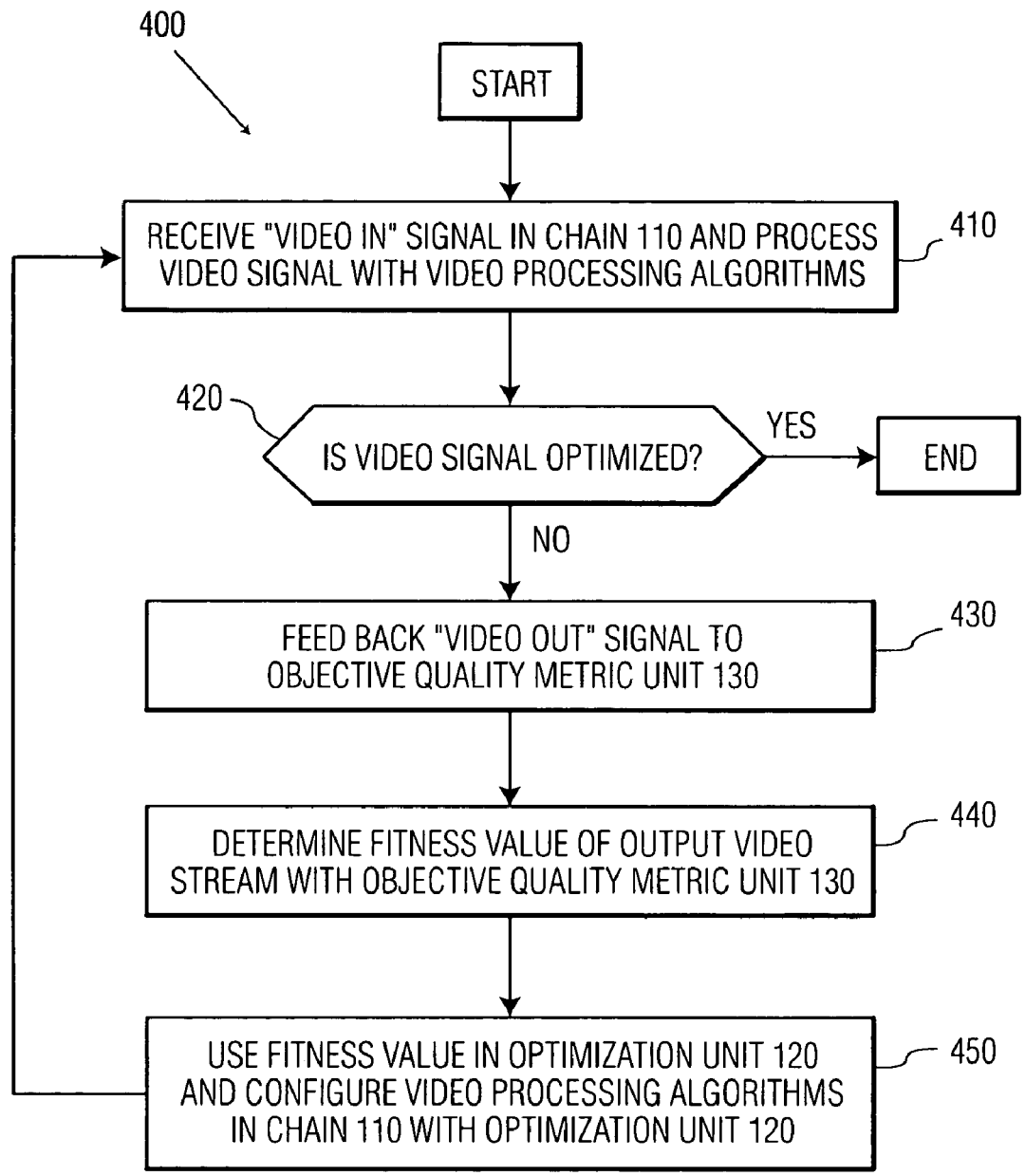
FIG. 4 depicts a flow diagram that illustrates the operation of an advantageous embodiment of the method of the present invention in which a chain of video processing algorithms is optimized to obtain a high quality video signal.

FIG. 4 depicts flow diagram 400 that illustrates the operation of exemplary video processing system 100 according to one advantageous embodiment of the present invention. Video processing system 100 receives a "Video In" signal in chain 110 of video processing algorithms and processes the video signal with video processing algorithms (210, 220, 230, 240) (process step 410). A determination is made whether the video signal has been optimized (decision step 420). If the video signal has been optimized, then the process ends. If the video signal has not been optimized, then control passes to process step 430.

A copy of the "Video Out" signal from chain 110 is fed back to objective quality metric unit 130 (process step 430). Objective quality metric unit 130 then determines a fitness value for the output video stream (process step 440). The fitness value is provided to a genetic algorithm in optimization unit 120 and optimization unit 120 uses the genetic algorithm to configure control parameter settings in video processing algorithms (210, 220, 230, 240) in chain 110 (process step 450). Control then passes to process step 410. The video signal that is present in chain 410 is processed with the newly configured video processing algorithms (210, 220, 230, 240) (process step 410). The process continues until the video signal is optimized.

Therefore, the system and method of the present invention comprises an improved video processing system 100 that is capable of optimizing the control parameter settings of a chain 110 of video processing algorithms (210, 220, 230, 240). In one advantageous embodiment, the system and method of the present invention uses a genetic algorithm to iteratively converge the values of the control parameter settings toward a configuration of control parameter settings that produces a very high quality video image.

Although the present invention has been described in detail, those skilled in the art should understand that they can make various changes, substitutions and alterations herein without departing from the spirit and scope of the invention in its broadest form.

What is claimed is:

1. For use in a video processing system of the type comprising a chain of video processing algorithms for processing a video stream, a system for optimizing at least one control parameter setting of at least one of said video processing algorithms in said chain of video processing algorithms, said system comprising:
   an optimization unit comprising an algorithm capable of optimizing said at least one control parameter setting of said at least one video processing algorithm, without regard to prior information of said at least one video processing algorithm.

2. The system as claimed in claim 1 further comprising an objective quality metric unit coupled to said optimization unit, said objective quality metric unit capable of receiving an output video stream from said chain of video processing algorithms, and capable of determining a fitness value that characterizes the video quality of said output video stream, and capable of providing said fitness value to said algorithm in said optimization unit.

3. The system as claimed in claim 2 wherein said algorithm in said optimization unit optimizes said at least one control parameter setting of said at least one video processing algorithm using said fitness value.

4. The system as claimed in claim 1 wherein said optimization unit comprises an algorithm that is capable of optimizing a plurality of control parameter settings of each of a plurality of video processing algorithms in said chain of video processing algorithms.

5. The system as claimed in claim 4 further comprising an objective quality metric unit coupled to said optimization unit, said objective quality metric unit capable of receiving an output video stream from said chain of video processing algorithms, and capable of determining a fitness value that characterizes the video quality of said output video stream, and capable of providing said fitness value to said algorithm in said optimization unit.

6. For use in a video processing system of the type comprising a chain of video processing algorithms for processing a video stream, a system for optimizing at least one control parameter setting of at least one of said video processing algorithms in said chain of video processing algorithms, said system comprising:
   a genetic algorithm unit comprising a genetic algorithm capable of optimizing said at least one control parameter setting of said at least one video processing algorithm without regard to prior information of said at least one video processing algorithm.

7. The system as claimed in claim 6 further comprising an objective quality metric unit coupled to said genetic algorithm unit, said objective quality metric unit capable of receiving an output video stream from said chain of video processing algorithms, and capable of determining a fitness value that characterizes the video quality of said output video stream, and capable of providing said fitness value to said genetic algorithm in said genetic algorithm unit.

8. The system as claimed in claim 7 wherein said genetic algorithm in said genetic algorithm unit optimizes said at least one control parameter setting of said at least one video processing algorithm using said fitness value.

9. The system as claimed in claim 6 wherein said genetic algorithm unit comprises a genetic algorithm that is capable of optimizing a plurality of control parameter settings of each of a plurality of video processing algorithms in said chain of video processing algorithms.

10. The system as claimed in claim 9 further comprising an objective quality metric unit coupled to said genetic algorithm unit, said objective quality metric unit capable of receiving an output video stream from said chain of video processing algorithms, and capable of determining a fitness value that characterizes the video quality of said output video stream, and capable of providing said fitness value to said genetic algorithm in said genetic algorithm unit.

11. The system as claimed in claim 10 wherein said genetic algorithm in said genetic algorithm unit optimizes a plurality of control parameter settings of a plurality of said video processing algorithms using said fitness value.

12. The system as claimed in claim 11 wherein at least one of said plurality of control parameter settings comprises the order of application of said video processing algorithms in said chain of video processing algorithms.

13. The system as claimed in claim 11 wherein at least one of said plurality of control parameter settings of said video processing algorithms comprises one of: a bit precision parameter, a noise reduction parameter, and a peaking parameter.

14. For use in a video processing system of the type comprising a plurality of chains of video processing algorithms for processing a plurality of video streams, a system for optimizing a plurality of control parameter settings of a plurality of video processing algorithms in said plurality of chains of video processing algorithms, said system comprising:
   a plurality of genetic algorithm units coupled to said plurality of parallel chains of video processing algorithms, each of said plurality of genetic algorithm units comprising a genetic algorithm capable of optimizing said plurality of control parameter settings of said plurality of video processing algorithms without regard to prior information of said at least one video processing algorithm; and
   a plurality of objective quality metric units, each of said plurality of objective quality metric units coupled to one of said plurality of genetic algorithm units, each of said plurality of objective quality metrics capable of receiving an output video stream from one of said plurality of chains of video processing algorithms, and capable of determining a fitness value that characterizes the video quality of said output video stream, and capable of providing said fitness value to a genetic algorithm in a genetic algorithm unit to which said objective quality metric unit is coupled;
   wherein said genetic algorithm in each of said plurality of genetic algorithm units optimizes a plurality of control parameter settings of said plurality of video processing algorithms using said fitness values.

15. The system as claimed in claim 6 comprising a genetic algorithm in which candidate solutions that will not provide an improvement in video quality are excluded.

16. The system as claimed in claim 6 comprising a genetic algorithm in which a limited number of representative candidate solutions that are likely to provide an improvement in video quality are considered.

17. The system as claimed in claim 6 comprising a genetic algorithm in which candidate solutions are considered that derive from previously existing desirable candidate solutions that are likely to provide an improvement in video quality.

18. For use in a video processing system of the type comprising a chain of video processing algorithms for processing a video stream, a method for optimizing at least one control parameter setting of at least one of said video processing algorithms in said chain of video processing algorithms, said method comprising the step of:
   using an algorithm in an optimization unit to optimize, without regard to prior information of said at least one video processing algorithm, said at least one control parameter setting of said at least one of said video processing algorithms.

19. The method as claimed in claim 18 wherein said algorithm comprises a genetic algorithm.

20. The method as claimed in claim 19 further comprising the steps of:
   receiving an output video stream from said chain of video processing algorithms in an objective quality metric unit;
   determining in said objective quality metric unit a fitness value for said output video stream;
   providing said fitness value to said genetic algorithm; and
   using said fitness value in said genetic algorithm to optimize said at least one control parameter setting of said at least one of said video processing algorithms.

21. The method as claimed in claim 19 wherein said genetic algorithm is capable of optimizing a plurality of control parameter settings of each of a plurality of video processing algorithms in said chain of video processing algorithms.

22. The method as claimed in claim 21 further comprising the steps of:
   receiving an output video stream from said chain of video processing algorithms in an objective quality metric unit;

determining in said objective quality metric unit a fitness value for said output video stream;

providing said fitness value to said genetic algorithm; and using said fitness value in said genetic algorithm to optimize said plurality of control parameter settings of a plurality of said video processing algorithms.

23. The method as claimed in claim 22 wherein at least one of said plurality of control parameter settings comprises the order of application of said video processing algorithms in said chain of video processing algorithms.

24. The method as claimed in claim 22 wherein at least one of said plurality of control parameter settings of said video processing algorithms comprises one of: a bit precision parameter, a noise reduction parameter, and a peaking parameter.

* * * * *